United States Patent
Tarbet et al.

[11] Patent Number: 6,117,330
[45] Date of Patent: Sep. 12, 2000

[54] PROCESS OF USING SULFUR AND NITROGEN-CONTAINING HYDROCARBONS IN RECOVERING AND CONCENTRATING DESIRED IONS FROM SOLUTIONS THEREOF

[75] Inventors: Bryon J. Tarbet, Highland; Ronald L. Bruening, Salt Lake City; Jerald S. Bradshaw; Reed M. Izatt, both of Provo, all of Utah

[73] Assignee: Brigham Young University, Provo, Utah

[21] Appl. No.: 07/545,209

[22] Filed: Jun. 28, 1990

Related U.S. Application Data

[62] Division of application No. 07/236,763, Aug. 26, 1988, Pat. No. 5,071,819.

[51] Int. Cl.$^7$ .................................................. B01D 15/00
[52] U.S. Cl. ........................ 210/670; 210/679; 210/688
[58] Field of Search .................................. 210/670, 679, 210/681, 688

[56] References Cited

U.S. PATENT DOCUMENTS 4,952,321  8/1990  Bradshaw et al. ...................... 210/670

Primary Examiner—Ivars Cintins

[57] ABSTRACT

The invention has compositions of matter and process aspects.

The compositions of matter aspects relate to a class of new organic compounds, viz., intermediates which are sulfur and nitrogen containing hydrocarbons covalently bonded to trialkoxysilane and those intermediates covalently bonded to a solid inorganic support such as silica.

The process aspect comprises two processes, viz., (1) a process for making the new class of compounds, and (2) the process of removing and/or concentrating certain ions such as noble metal ions and other transition metal ions, from solutions thereof admixed with other ions which may be present in much higher concentrations by forming a complex of the desired ion(s) with a compound as stated, e.g., by flowing the solution through a column packed with the compound, breaking the complex, e.g., by flowing a receiving liquid through the column to remove the desired ion(s) in solution in the receiving liquid and recovering the desired ion(s) from the receiving liquid.

14 Claims, 1 Drawing Sheet

PROCESS OF USING SULFUR AND NITROGEN-CONTAINING HYDROCARBONS IN RECOVERING AND CONCENTRATING DESIRED IONS FROM SOLUTIONS THEREOF

This is a division of application Ser. No. 07/236,763 filed Aug. 26, 1988, now U.S. Pat. No. 5,071,819.

INTRODUCTION

The present invention has composition and process aspects.

The composition aspect comprises a new class of organic compounds, more particularly, a sulfur and nitrogen-containing hydrocarbon covalently bonded to an inorganic solid support, e.g., sand, silica gel, glass, glass fibers, titania, zirconia, alumina or nickel oxide.

The process aspect comprises two processes, viz., (1) a process for making the new class of organic compounds and (2) the process of removing and concentrating certain ions, such as noble metal ions and other transition metal ions, from solutions thereof admixed with other ions which may be present in much higher concentrations, by forming a complex of the desired ions with a compound of class B, e.g., by flowing such solutions through a column packed with a compound as described, e.g., by flowing a receiving liquid of much smaller volume than the volume of solution originally passed through the column, to remove and concentrate the desired ions in solution in the receiving liquid, and recovering the desired ions from the receiving liquid.

The sulfur and nitrogen-containing materials covalently bonded to an inorganic solid support, e.g., sand, silica gel, glass, glass fibers, titania, zirconia, alumina or nickel oxide., are shown in Formula 1.

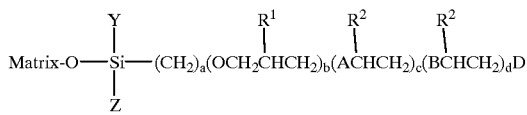

A and B=any combination of $N(R^3)$ or $N(R^3)CH_2$ or O or $OCH_2$ or S or $SCH_2$, but A or B must be $N(R^3)$ or $N(R^3)CH_2$; D=H, $NH(R^3)$, SH, OH, lower alkyl, or $N(R^3)CH_2CH(R^1)$ $CH_2O(CH_2)_aSiXYZ$; X=Cl, $OCH_3$, $OCH_2H_5$, or O-matrix; Y and Z=Cl, $OCH_3$, $OC_2H_5$, methyl, ethyl or halogenated substituents thereof, or O-matrix; $R^1$=H, SH, OH, lower alkyl or aryl such as phenyl, naphthyl or pyridyl; $R^2$=H or lower alkyl; $R^3$=H, $[(CH_2)_fE]_gR^4$ where E=S, Se, Te, and $R^4$=hydrogen, lower alkyl, aryl; a=2 to about 10; b=0 or 1; c=1 to about 2000; d=0 to about 2000, f=2 to about 10, g=1 to about 10.

Where matrix=sand or silica gel, glass, glass fibers, alumina, zirconia, titania or nickle oxide.

FORMULA 1

The process of producing the new compounds of Formula 1 is described fully hereafter.

The process of selectively and quantitatively removing and concentrating a selected ion or group of ions of the noble metal type, e.g., gold, silver, the platinum metals, e.g., platinum, palladium, rhodium and iridium; and, when noble metals are not present, ions of mercury, lead, zinc, and other transition metals, present at low concentrations from a plurality of other ions in a multiple ion solution in which the other ions may be present at much higher concentrations comprises bringing the multiple ion solution into contact with a compound of Formula 1 of the invention which causes the desired ion(s) to complex with said compound, breaking the complex with a receiving liquid which takes the ion(s) into solution, and recovering the ion(s) therefrom.

The preferred embodiment disclosed herein involves carrying out the process by bringing a large volume of the multiple ion solution into contact with a compound of the invention in a separation column through which the mixture is first flowed to complex the desired ion or ions with said compound followed by the flow through the column of a smaller volume of a receiving liquid such as aqueous $NH_3$, for example, to break the complex by chemical or thermal means, dissolve the desired ions and carry them out of the column. Instead of using a column, the compound of the invention may be slurried in a suitable liquid, e.g., water, the ion mixture is present or added to the liquid, the desired ion(s) complex with the compound of the invention, the slurry is filtered, washed with a receiving liquid to break the complex and recover the desired ion. The desired metal ions are then recovered from the receiving phase by well known procedures.

More particularly, the said process comprises forming a covalent chemical bond between an inorganic solid support, preferably, sand or silica gel, and at least one of the compounds of Formula 1, placing the resulting bonded silica compound of Formula 1 in a contacting device such as a tall column, causing a large volume of the mixture of ions to flow through the column where the desired metal ions complex with the bonded silica which separates them from the rest of the mixture which flows out of the column, then flowing a small volume of the receiving liquid through the column to break the complex and dissolve and carry out of the column the desired metal ion(s). The desired metal ions are then recovered form the receiving liquid by well know procedures.

The process of making the compounds represented by Formula 1 is also a part of the invention.

BACKGROUND OF THE INVENTION

The fact is known that macrocyclic polythioethers and certain other sulfur-containing hydrocarbon ligands present as solutes in a solvent such as water are characterized by their ability to selectivity form strong bonds with the noble metal, platinum group metal, and mercury ions or groups of these ions present as solutes in the same solvent as described in articles by R. M. Izatt, R. E. Terry, L. K. Hansen, A. G. Avondet, J. S. Bradshaw, K. K. Dalley, T. E. Jensen and J. J. Christensen, *A CALORIMETRIC TITRATION STUDY OF UNI- AND BIVALENT METAL ION INTERACTION WITH SEVERAL THIA DERIVATIVES OF 9-CROWN-3,12-CROWN-4,15-CROWN-5,18-CROWN-6,24-CROWN-8, AND SEVERAL OXATHIAPENTADECANES IN WATER OR WATER-METHANOL SOLVENTS AT 25° C.,* Inorganica Chimica Acta, 1978, Vol. 20, 1–8 for the complexation of silver and mercury ions by open chain sulfur-containing hydrocarbons and by S. R. Cooper, *CROWN THIOETHER CHEMISTRY,* Accounts of Chemical Research, 1988, Vol. 21, 141–146 for the complexation of rhodium and silver ions by macrocyclic sulfur-containing ligands. However, researchers have not previously been able to incorporate sulfur and nitrogen-containing hydrocarbon ligands into separation systems where the behavior of the sulfur and nitrogen-containing ligands in the separation systems in comparison to that of the sulfur and nitrogen-containing ligand as a solute is unchanged and/or the sulfur and nitrogen-containing ligand will remain in the separation system. Articles such as those entitled *SILANE COMPOUNDS FOR SILYLATING SURFACES* by E. P. Plueddeman, in "Silanes, Surfaces and Interfaces Symposium, snowmass, 1985," Ed. by D. E. Leyden, Gordon and Breach, Publishers, 1986, pp.1–25 and *SILANE COUPLING AGENTS* by E. P. Plueddemann, Plenum Press, 1982, pp.1–235 list many different types of organic materials which have been attached to silane compounds and discusses some of their properties. The preparation and uses of sulfur and nitrogen-containing hydrocarbons attached to silane or silica have not been disclosed in the above mentioned article or in any existing patents. Thus, the unique complexing properties of certain sulfur and nitrogen-containing hydrocarbons and the ability to attach these sulfur-containing complexing agents to an inorganic solid support without reducing their ability to complex certain metal ions is of utmost importance in the industrial use of the sulfur and nitrogen-containing hydrocarbon ligands. The process of the present invention accomplished this feat.

SUMMARY OF THE INVENTION

The compounds of the present invention comprise certain sulfur-containing hydrocarbon ligands covalently bonded to an inorganic solid support, e.g., sand, silica gel, glass, glass fibers, titania, zirconia, alumina or nickel oxide. The compounds are identified above in Formula 1. The process of the present invention uses the compounds, which are characterized by high selectivity for and removal of desired metal ions or groups of metal ions such as the noble metal ions present at low concentrations from a source phase containing a mixture of these metal ions with the ions one does not desire to remove present, often in much greater concentrations in the solution, in a separation device such as a column through which the solution is flowed. The process of selectively removing and concentrating the desired ion(s) is characterized by the ability to quantitatively complex from a large volume of solution the desired ion(s) when they are present at low concentrations. The said ions are recovered form the separation column by flowing through it a small volume of a receiving phase which contains a solubilized reagent which need not be selective, but which will strip the ions from the ligand quantitatively. The recovery of the desired metal ions from the receiving phase is easily accomplished by well known procedures. The process of producing the compounds of Formula 1 is an important part of the present invention.

BRIEF DESCRIPTION OF THE DRAWINGS

The invention will be described and illustrated by reference to a drawing in which.

DESCRIPTION OF THE PREFERRED EMBODIMENT OF THE INVENTION

Figure 1:
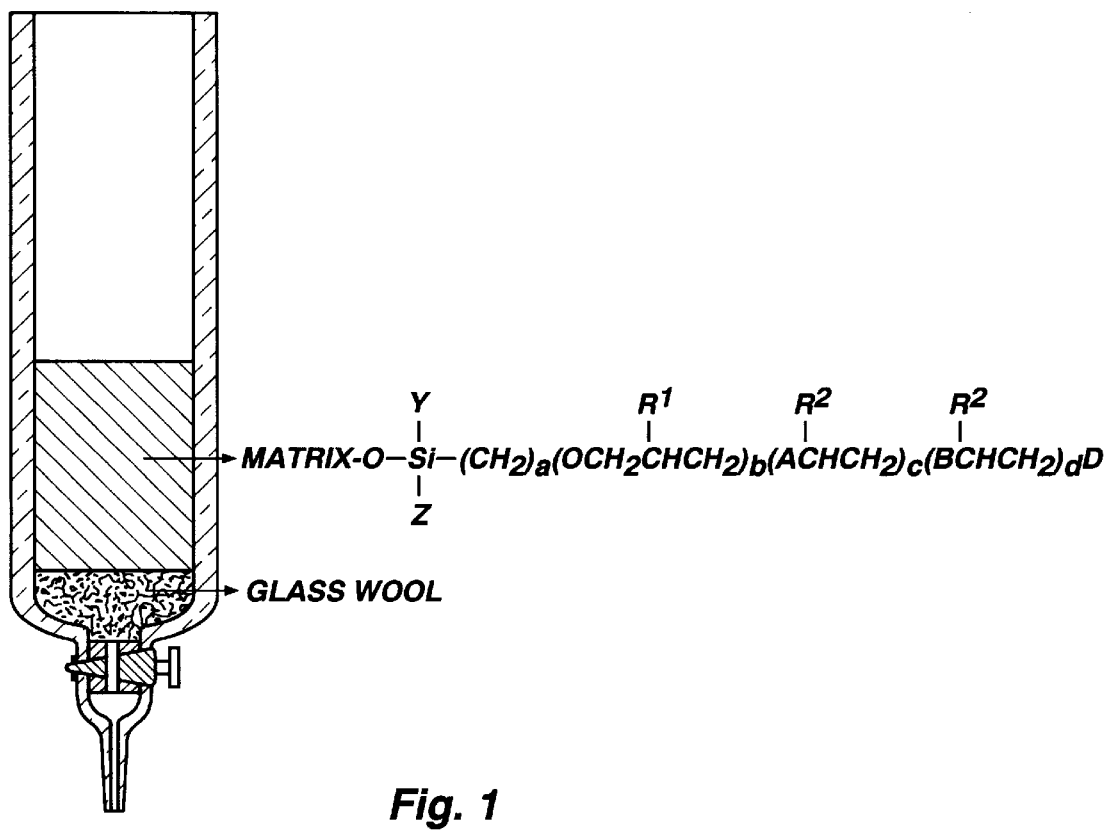
FIG. 1 represents schematically a suitable column for holding the silica bonded sulfur and nitrogen-containing hydrocarbon ligand material through which a solution of metal ions can be flowed to complex selectively with a desired ion or group of ions in accordance with the invention.

The preferred embodiment of the ion-recovery process of the invention utilizes the new compounds represented by Formula 1. Sulfur and nitrogen-containing hydrocarbon ligands must be covalently bonded to an inorganic solid support in accordance with the invention.

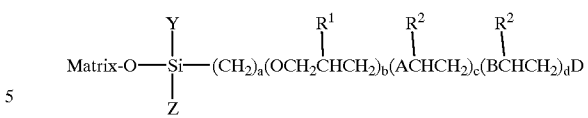

A and B=any combination of $N(R^3)$ or $N(R^3)CH_2$ or O or $OCH_2$ or S or $SCH_2$, but A or B must be $N(R^3)$ or $N(R_3)CH_2$; D=H, $NH(R^3)$, SH, OH, lower alkyl, or $N(R^3)CH_2CH(R^1)$ $CH_2O(CH_2)_a SiXYZ$; X=Cl, $OCH_3$, $OCH_2H_5$, or O-matrix; Y and Z=Cl, $OCH_3$, $OC_2H_5$, methyl, ethyl or halogenated substituents thereof, or O-matrix; $R^1$=H, SH, OH, lower alkyl or aryl such as phenyl, naphthyl or pyridyl; $R^2$=H or lower alkyl; $R^3$=H, $[(CH_2)_f E]_g R^4$ where E=S, Se, Te, and $R^4$=hydrogen, lower alkyl, aryl; a=2 to about 10; b=0 or 1; c=1 to about 2000; d=0 to about 2000, f=2 to about 10, g=1 to about 10.

Where matrix=sand or silica gel, glass, glass fibers, alumina, zirconia, titania or nickle oxide.

FORMULA 1

As a specific example, γ-glycidoxypropyltrimethoxysilane was first covalently bonded to silica gel and then ethylenediamine was reacted with the epoxide function. This intermediate was further reacted with ethylene sulfide to give a material containing both sulfur and nitrogen, $(CH_3O)_3Si(CH_2)_3OCH_2CH(OH)$ $CH_2NRCH_2CH_2NRH$ where R is a repeating ethylenethio group.

The following two examples are given to illustrate compounds which have been made in accordance with Formula 1 of the present invention. These examples are illustrative only and are not comprehensive of the many different compounds which have or can be made within the scope of the present invention.

EXAMPLE 1

Silica gel (30 g, 60–200 mesh) was slowly added to 375 mL of toluene and 7.5 g of γ-glycidoxypropyltrimethoxysilane. The mixture was maintained in suspension by mechanical stirring and was heated at reflux overnight. Ethylenediamine (1.25 g) was then added to the suspension and heated an additional 5 hours. The mixture was allowed to cool and 5.2 g of ethylene sulfide was added. The suspension was stirred at room temperature for 6 hours and then heated to 80° C. overnight to effect reaction. The product was isolated by filtration and allowed to air dry.

EXAMPLE 2

Silica gel was covalently attached to γ-glycidoxypropyltrimethoxysilane in the same manner as above. This intermediate was then reacted with pentaethylenehexamine and ethylene sulfide successively as above in a mole ratio of 3 to 1 such that there are -Tree ethylenethio groups per nitrogen.

The compounds of Formula 1 are covalently bonded to any inorganic solid support which has surface hydroxylic groups which may be covalently modified to include the ligand as shown in the first step of Equation 1. The reaction can take place by first, dissolving the compound of Formula 1 in a low boiling solvent such as dichloromethane, adding the solid support, removing the the low boiling solvent, then heating the coated support at about 120° C. for 3 to about 18 hours under vacuum. A second procedure to cause the compounds of Formula 1 to react with a solid support is to heat the solid support with the compound of Formula 1 in a high boiling solvent such a toluene.

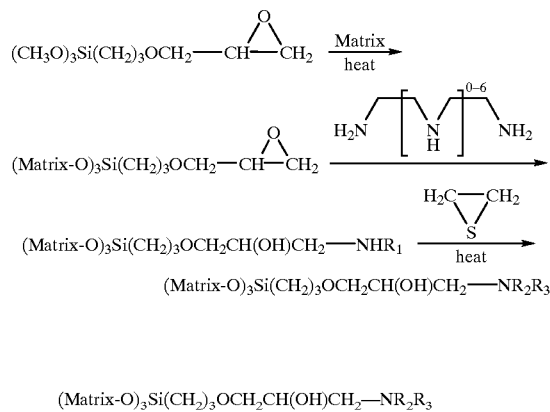

$R_1=[(CH_2)_nNH]_m$, $R_2=[(CH_2)_nNHR_3]_m$, $R_3=[(CH_2)_nG]_m$, G=S, Se, Te, n and m=about 2 to 10.

EQUATION 1

METAL ION RECOVERY AND CONCENTRATION PROCESS

The metal ion recovery and concentration process of the invention relates to the selective recovery of desired metal ions from mixtures thereof with other metal ions using the compounds of Equation 1 of the invention as defined above. Effective methods of recovery and/or separation of metal ions, particularly the noble metal ions, from other metal ions in water supplies, waste solutions, deposits and industrial solutions and silver recovery from waste solutions, e.g. from emulsions on photographic and X-ray film, represent a real need in modern technology. These ions are typically present at low concentrations in solutions containing other ions in much greater concentration. Hence, there is a real need for a process to selectively recover and concentrate these metal ions. The present invention accomplishes this separation effectively and efficiently by the use of compounds selected from the families represented by Formula 1.

The silica gel material of Formula 1 is placed in a column as shown in FIG. 1. An aqueous solution containing the desired ion(s), in a mixture of other ions which may be in much greater concentration, is passed through the column. The flow rate may be controlled by applying pressure to the top of the column or by applying vacuum to the receiving vessel at the bottom of the column. After the solution has passed through the column, a volume of a recovery solution, i.e. aqueous sodium thiosulfate, aqueous ammonia, or aqueous sodium cyanide, which forms a stronger complex with the desired noble metal ions, or in their absence other metal ions, as stated above, is passed through the column. This recovery solution contains only the desired metal ions in a more concentrated form.

The following examples of separations of metal ions by the silica gel-bound sulfur and nitrogen-containing materials of Examples 1 and 2 are given as illustrations. These examples are illustrative only and are not comprehensive of the many separations of noble metal, platinum group metal, and in some cases transition metal ions that are possible using the materials made within the scope of this invention.

EXAMPLE 3

In this example, 4 g of the silica-bound sulfur and nitrogen-containing hydrocarbon of Example 1 was placed in a column as shown in FIG. 1. A 500 mL solution of approximately 10 ppm (parts per million) copper ion in 1M HCl was drawn through the column using a vacuum pump at 600 torr to increase the flow rate. A 25 mL aqueous solution of 2M $NH_3$, 1M HCl was then passed through the column. Analysis of the recovery solution by atomic absorption spectroscopy (AA) showed greater than 95% of the copper (II) ions originally in the 500 mL solution described above was in the 25 mL recovery solution.

EXAMPLE 4

The experiment of Example 3 was repeated with 10 g of the silica-bound sulfur and nitrogen-containing hydrocarbon of Example 2. A 100 mL solution of 10 ppm Au (I) in 0.01M KCN was passed through the column. A 10 mL aqueous solution of 5M KCN was then passed through the column. Analysis of the recovery solution by AA showed that about 90% of the Au (I) ions originally present in the 100 mL Au (I) solution was found in the 10 mL recovery solution.

From the foregoing, it will be appreciated that the sulfur and nitrogen-containing hydrocarbon ligands of Formula 1 bonded to a solid support such as silica gel of the present invention provide a material useful for the separation and concentration of the noble metal cations from mixtures of those cations with other metal cations and also in the presence of strong acids or strong complexing agents. The noble metals can then be recovered from the concentrated recovery solution by standard techniques known in the science of these materials. In the absence of noble metal ions for other transition metal ions may be recovered.

Although the invention has been described and illustrated by reference to certain specific silica gel-bound sulfur and nitrogen-containing hydrocarbon ligands of Formula 2 and the process of using them, analogs of these sulfur and nitrogen-containing hydrocarbon ligands are within the scope of the compounds and processes of the invention as defined in the following claims.

What is claimed is:

1. The process of removing desirable ions from a multiple ion solution containing non-desired ions, said process comprising contacting the multiple ion solution with a compound having the formula

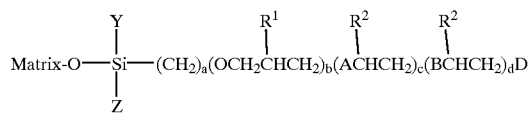

wherein A and B are members selected from the group consisting of $N(R^3)$, $N(R^3)CH_2$, O, $OCH_2$, S and $SCH_2$, with the further proviso that if A is selected from the group consisting of O, $OCH_2$, S and $SCH_2$ then B must be selected from the group consisting of $N(R^3)$ and $N(R^3)CH_2$; D is a member selected from the group consisting of H, SH, OH, $NH(R_3)$, lower alkyl and $N(R^3)CH_2CH(R^1)CH_2O(CH_2)_aSiXYZ$; X is a member selected from the group consisting of Cl, O-matrix, $OCH_3$ and $OC_2H_5$; Y and Z are members selected from the group consisting of Cl, O-matrix, $OCH_3$, $OC_2H_5$, methyl, ethyl and halogenated substituents thereof; $R^1$ is a member selected from the group consisting of H, SH, OH, lower alkyl and aryl; $R^2$ is a member selected from the group consisting of H and lower alkyl; $R^3$ is a member selected from the group consisting of H and $[(CH_2)_fE]_gR^4$, where E is selected from the group consisting of S, Se and Te; and $R^4$ is a member selected from the group consisting of H, lower alkyl and aryl; a is from 2 to about 10; b is 0 or 1; c is from 1 to about 2000; d is from 0 to about 2000; f is from 2 to about 10; g is from 1 to about 10; and matrix is selected from the group consisting of sand, silica gel, glass, glass fibers, alumina, zirconia, titania or nickel oxide;

forming a complex between the desired ions and said compound to remove the desired ions from said multiple ion solution;

separating the multiple ion solution from which the desired ions have been removed from said complex formed between said compound and the desired ions;

breaking said complex to liberate the complexed ions; and dissolving the liberated ions in a receiving liquid.

2. A process as defined in claim 1 wherein D is $NR^3CH_2CH(R^1)CH_2O(CH_2)_aSi(O\text{-matrix})_3$.

3. A process as defined in claim 1 wherein X, Y and Z are O-matrix.

4. A process as defined in claim 1 wherein the volume of receiving liquid into which the liberated ions are dissolved is less than the volume of the starting multiple ion solution.

5. A process as defined in claim 4 wherein the dissolved ions in the receiving liquid are recovered from said receiving liquid.

6. A process as defined in claim 1 wherein a is 3, b is 1, c is 4, $R^1$ is OH, $R^2$ is H, A contains nitrogen, d is 0 so that B is absent, D is $N(R^3)CH_2CH(R^1)CH_2O(CH_2)_aSiXYZ$, and X, Y and Z are each O-matrix.

7. A process as defined in claim 1 wherein a is 3, b is 1, c is 4, d is 1, $R^1$ is OH, $R^2$ is H, A contains nitrogen, B contains nitrogen, D is $N(R^3)CH_2CH(R^1)CH_2O(CH_2)_a SiXYZ$, and X, Y and Z are each O-matrix.

8. The process of separating desired noble metal ions from a multiple ion solution containing non-desired ions, said process comprising contacting the multiple ion solution with a compound having the formula

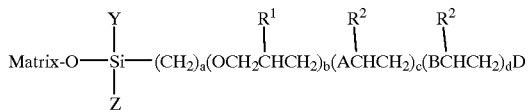

wherein A and B are members selected from the group consisting of $N(R^3)$, $N(R^3)CH_2$, O, $OCH_2$, S and $SCH_2$, with the further proviso that if A is selected from the group consisting of O, $OCH_2$, S and $SCH_2$ then B must be selected from the group consisting of $N(R^3)$ and $N(R^3)CH_2$; D is a member selected from the group consisting of H, SH, OH, $NH(R_3)$, lower alkyl and $N(R^3)CH_2CH(R^1)CH_2O(CH_2)_aSiXYZ$; X is a member selected from the group consisting of Cl, O-matrix, $OCH_3$ and $OC_2H_5$; Y and Z are members selected from the group consisting of Cl, O-matrix, $OCH_3$, $OC_2H_5$, methyl, ethyl and halogenated substituents thereof; $R^1$ is a member selected from the group consisting of H, SH, OH, lower alkyl and aryl; $R^2$ is a member selected from the group consisting of H and lower alkyl; $R^3$ is a member selected from the group consisting of H and $[(CH_2)_fE]_gR^4$, where E is selected from the group consisting of S, Se and Te; and $R^4$ is a member selected from the group consisting of H, lower alkyl and aryl; a is from 2 to about 10; b is 0 or 1; c is from 1 to about 2000; d is from 0 to about 2000; f is from 2 to about 10; g is from 1 to about 10; and matrix is selected from the group consisting of sand, silica gel, glass, glass fibers, alumina, zirconia, titania or nickel oxide;

forming a complex between the desired ions and said compound to remove the desired ions from said multiple ion solution;

separating the multiple ion solution from which the desired ions have been removed from said complex formed between said compound and the desired ions;

breaking said complex to liberate the complexed ions; and dissolving the liberated ions in a receiving liquid.

9. A process as defined in claim 8 wherein D is $NR^3CH_2CH(R^1)CH_2O(CH_2)_aSi(O\text{-matrix})_3$.

10. A process as defined in claim 8 wherein X, Y and Z are O-matrix.

11. A process as defined in claim 8 wherein the volume of receiving liquid into which the liberated ions are dissolved is less than the volume of the starting multiple ion solution.

12. A process as defined in claim 11 wherein the dissolved ions in the receiving liquid are recovered from said receiving liquid.

13. A process as defined in claim 8 wherein a is 3, b is 1, c is 4, $R^1$ is OH, $R^2$ is H, A contains nitrogen, d is 0 so that B is absent, D is $N(R^3)CH_2CH(R^1)CH_2O(CH_2)_aSiXYZ$, and X, Y and Z are each O-matrix.

14. A process as defined in claim 8 wherein a is 3, b is 1, c is 4, d is 1, $R^1$ is OH, $R^2$ is H, A contains nitrogen, B contains nitrogen, D is $N(R^3)CH_2CH(R^1)CH_2O(CH_2)_a SiXYZ$, and X, Y and Z are each O-matrix.

* * * * *